(12) United States Patent
Liu et al.

(10) Patent No.: US 11,618,314 B2
(45) Date of Patent: Apr. 4, 2023

(54) SUPPORT FOR CONNECTING UPPER AND LOWER SURFACES INSIDE FUEL TANK

(71) Applicant: YAPP AUTOMOTIVE SYSTEMS CO., LTD., Yangzhou (CN)

(72) Inventors: Liang Liu, Yangzhou (CN); Weidong Su, Yangzhou (CN); Wenjuan Dou, Yangzhou (CN); Lin Jiang, Yangzhou (CN)

(73) Assignee: YAPP AUTOMOTIVE SYSTEMS CO., LTD., Yangzhou (CN)

( * ) Notice: Subject to any disclaimer, the term of this patent is extended or adjusted under 35 U.S.C. 154(b) by 131 days.

(21) Appl. No.: 17/049,961

(22) PCT Filed: Apr. 24, 2019

(86) PCT No.: PCT/IB2019/000536
§ 371 (c)(1),
(2) Date: Oct. 23, 2020

(87) PCT Pub. No.: WO2019/207362
PCT Pub. Date: Oct. 31, 2019

(65) Prior Publication Data
US 2021/0237558 A1  Aug. 5, 2021

(30) Foreign Application Priority Data
Apr. 24, 2018  (CN) .......................... 201810372698.8
Apr. 24, 2018  (CN) .......................... 201820590658.6

(51) Int. Cl.
*B60K 15/073*  (2006.01)
*B60K 15/03*  (2006.01)

(52) U.S. Cl.
CPC .... *B60K 15/03* (2013.01); *B60K 2015/03493* (2013.01)

(58) Field of Classification Search
CPC .................................................... B60K 15/073
See application file for complete search history.

(56) References Cited

U.S. PATENT DOCUMENTS

2015/0217635 A1* 8/2015 Nakane ................... B29C 49/20
 220/562
2018/0311880 A1* 11/2018 Sun ......................... B29C 49/32

FOREIGN PATENT DOCUMENTS

| CN | 104477027 A | 4/2015 |
|---|---|---|
| CN | 204249813 U | 4/2015 |
| CN | 105538659 A | 5/2016 |
| CN | 205523672 U | 8/2016 |
| CN | 207156929 U | 3/2018 |

(Continued)

*Primary Examiner* — Stephen J Castellano
(74) *Attorney, Agent, or Firm* — Bayramoglu Law Offices LLC

(57) ABSTRACT

A support for connecting the upper and lower surfaces inside a fuel tank includes a connecting column. Each of the upper and lower sides of the connecting column is provided with an end surface. The end surface is coated with plastic. The connecting column is provided with a notch, and the number of the connecting column is at least one. The connecting column is configured in an I-shape, an H-shape, an M-shape, a W-shape or other shapes. The shape of the notch is V-shaped, U-shaped, semicircular or irregular. The notch is provided on a left side or a right side of the connecting column or in a middle of the connecting column.

13 Claims, 3 Drawing Sheets

(56) References Cited

FOREIGN PATENT DOCUMENTS

| CN | 108382195 A | 8/2018 |
|---|---|---|
| CN | 208544112 U | 2/2019 |

\* cited by examiner

SUPPORT FOR CONNECTING UPPER AND LOWER SURFACES INSIDE FUEL TANK

CROSS REFERENCE TO THE RELATED APPLICATIONS

This application is the national phase entry of International Application No. PCT/IB2019/000536, filed on Apr. 24, 2019, which is based upon and claims priority to Chinese Patent Application No. 201810372698.8, filed on Apr. 24, 2018; and Chinese Patent Application No. 201820590658.6, filed on Apr. 24, 2018, the entire contents of which are incorporated herein by reference.

TECHNICAL FIELD

The present invention belongs to the technical field of structural components of fuel tanks, and more particularly, relates to a support for connecting the upper and lower surfaces inside a fuel tank.

BACKGROUND

Plastic fuel tanks are commonly used for cars due to their advantages of being lightweight, having corrosion resistance and variable product shapes. Plastic fuel tanks are typically made of high-density polyethylene (HDPE) and thus have insufficient resistance to pressure deformation, such as deformation caused by the weight of the fuel, infiltration and aging. Furthermore, plastic fuel tanks should resist high-pressure deformation in applications where the fuel is under pressure such as fuel tanks of plug-in hybrid vehicles. Manufacture of plastic fuel tanks is typically done according to a blow molding process, which squeezes and connects partial areas of the upper and lower surfaces of the plastic parison. The resulting structure is commonly known as a KISS-OFF structure. Such a structure has low connection strength, and greatly reduces the rated capacity of the fuel tank, which is less economical. Additionally, a plurality of supporting columns are commonly arranged inside the fuel tank to support the fuel tank. For example, the supporting column disclosed by the Chinese patent No. CN104477027A is a metal rod, and the metal rod is coated with plastic. This kind of metal stand column, however, is expensive to manufacture and requires anti-static treatment. The middle part of the metal stand column has higher strength than the parts connected at both ends, which makes the connecting part at both ends of the stand column failure-prone. Additionally, the high density of metal significantly increases the weight of the hollow tank. Although the aforementioned two methods of supporting the fuel tank both increase the strength of the fuel tank, when the fuel tank is involved in a collision, the high-strength supporting column of the prior art is hardly broken, causing fractures on the surface of the fuel tank, leakage and potential danger in the fuel tank. It is, therefore, highly desirable to provide a support that not only increases the strength of the fuel tank, but also can be fractured in time when the fuel tank is subjected to a collision, without damaging the fuel tank.

SUMMARY

Aiming at the technical problems identified in the prior art, the present invention provides a support for connecting the upper and lower surfaces inside a fuel tank. The overall structure in the technical solution is compact and ingenious in design. This technical solution not only ensures the strength of the fuel tank, but also makes the connecting column prone to fracture in the event of a collision, so as to prevent the surface of the fuel tank from damaging, prevent the fuel tank from leaking, and ensure the safety of the fuel tank.

In order to achieve the above-mentioned objective, the present invention adopts the following technical solutions. A support for connecting the upper and lower surfaces inside the fuel tank includes a connecting column. Each of the upper and lower sides of the connecting column is provided with a piece. The connecting column is provided with a notch, and the number of the connecting column is at least one. The shape of the piece is a circle, an ellipse, a crescent, a quadrilateral or an irregular figure. In specific applications, the pieces on both sides of the connecting column can be configured in the same size or different sizes. In practical applications, the size of the piece, which is first connected to a molten parison, on one side of the connecting column is generally larger to optimize the connection performance. Since the pieces are configured to be connected to two molten parisons of the fuel tank, the shape and size of the piece are selected according to the actual situation. The entire technical solution has an ingenious structural design and a low cost while meeting the strength requirements for the high-pressure resistance of the fuel tank.

As an improvement of the present invention, the shape of the connecting column is I-shaped, H-shaped, M-shaped or W-shaped.

As an improvement of the present invention, the shape of the notch is V-shaped, U-shaped, semicircular or irregular.

As an improvement of the present invention, the notch is provided on the left side or the right side of the connecting column or in the middle of the connecting column.

As an improvement of the present invention, the connecting column is a high-strength engineering plastic connecting column or an injection molded high-strength engineering plastic connecting column or an injection molded high-strength reinforced connecting rod, and the material of the connecting column includes HDPE, polyoxymethylene (POM), polyamide (PA), polyphthalamide (PPA) and other resins or engineering plastics.

As an improvement of the present invention, a reinforcing rib is provided on the connecting column to further improve the high-pressure resistance of the connecting device.

As an improvement of the present invention, a plurality of holes are formed between the connecting column and the piece to facilitate a good connection between the connecting column and the piece in the subsequent injection molding and coating processes, and prevent the connecting column from detaching from the piece under the action of tension.

As an improvement of the present invention, the coated piece is provided with a plurality of protrusions, and is welded to the hollow tank through the protrusions.

As an improvement of the present invention, the coated piece is configured as a smooth surface. The coated piece is preheated through a preheating plate and welded to the inner wall of the hollow tank. Alternatively, a groove is provided on the coated piece to form stepped pieces, so that the melted material is less likely to flow out of the piece during the welding preheating.

As an improvement of the present invention, the number of the connecting columns is two. The two supporting columns are bent in opposite directions and thus are more likely to fracture. The two connecting columns are connected by a connecting rod, and the material of the connecting rod is the same as that of the connecting column. A fixing hole is formed on the connecting rod and configured to fix the support when the piece is coated.

Compared with the prior art, the present invention has the following advantages. 1) The overall structure of the present invention is compact and has strong practicability. In this technical solution, the notch is provided on the connecting column to make the connecting column prone to fracture in the event of a collision while ensuring the strength of the fuel tank, thereby preventing the surface of the fuel tank from damaging and preventing the fuel tank from leaking. 2) The connecting column in this technical solution is a high-strength engineering plastic connecting column or an injection molded high-strength engineering plastic connecting column or an injection molded high-strength reinforced connecting rod. The material of the connecting column includes HDPE, POM, PA, PPA and other resins or engineering plastics, which is lighter in weight and better meets the lightweight requirements of modern cars. 3) The entire structure is capable of minimizing the required processes and materials to reduce the cost, and the support of the present invention can be placed at various positions of the fuel tank such as the fuel pump port position, which is more flexible. The support has the advantages of good heating and heat preservation effect, low power consumption, low manufacturing cost and high reliability.

In the figures: 1, connecting column; 2, piece; 3, connecting rod; 4, fixing hole; 5, notch; 6, groove; 7, protrusion.

DETAILED DESCRIPTION OF THE EMBODIMENTS

In order to facilitate the understanding of the present invention, the present invention will be further described and introduced below with reference to the drawings and specific embodiments.

Embodiment 1

Figure 1:
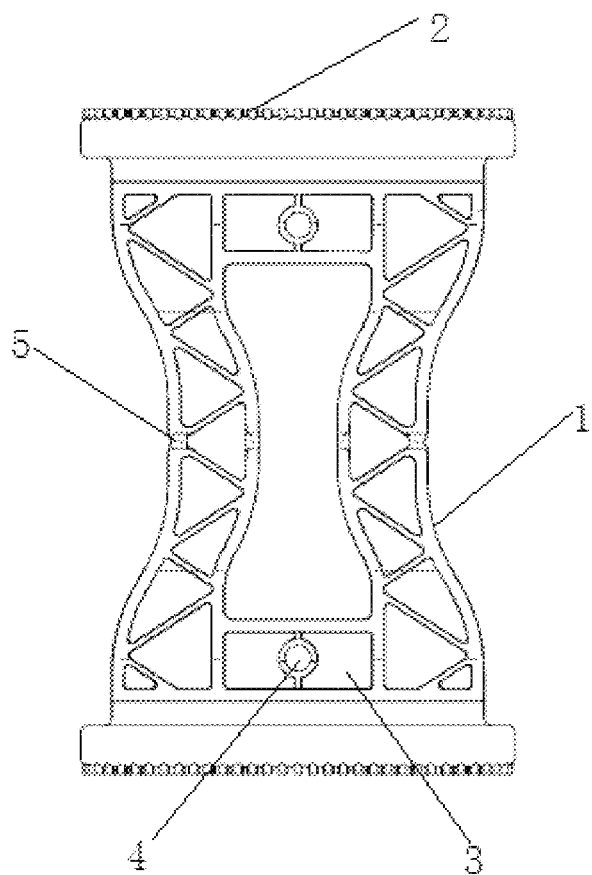
FIG. 1 is a schematic view of the overall structure of the present invention.
Figure 2:
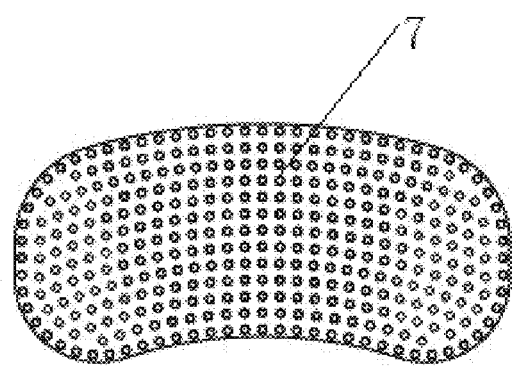
FIG. 2 is a schematic view of the structure of the piece with protrusions.

Referring to FIG. 1, a support for connecting the upper and lower surfaces inside a fuel tank includes the connecting column 1. Each of the upper and lower sides of the connecting column is provided with the piece 2, and the piece 2 is coated with plastic. The connecting column 1 is provided with the notch 5, and the number of the connecting column 1 is at least one. In this technical solution, the number of the connecting columns is two, and the overall shape of the connecting column is configured in an H-shape. The two connecting columns are connected by the connecting rod 3, wherein the fixing hole 4 is formed on the connecting rod, and the fixing hole 4 is configured to fix the entire support when the piece is coated. When the two connecting columns are arranged between the upper and lower pieces of the support, the connecting columns are solid. The diameter of the cross-section of the piece of the supporting column is smaller than the diameter of the cross-section of the piece of a hollow supporting column. The supporting column forms a curved shape and can be placed close to the accessories in the fuel tank, especially in the vicinity of the fuel pump that is subjected to large deformation, which overcomes the problem that the support with a single connecting column cannot be placed close to the accessories in the fuel tank. The notch on the connecting column causes stress and strain concentration, resulting in a notch effect. When the fuel tank is subjected to a collision or impact, the generated stress is concentrated at the notch, causing the supporting column to fracture at the notch first, so as to ensure that the support will not damage the fuel tank.

Embodiment 2

Figure 3:
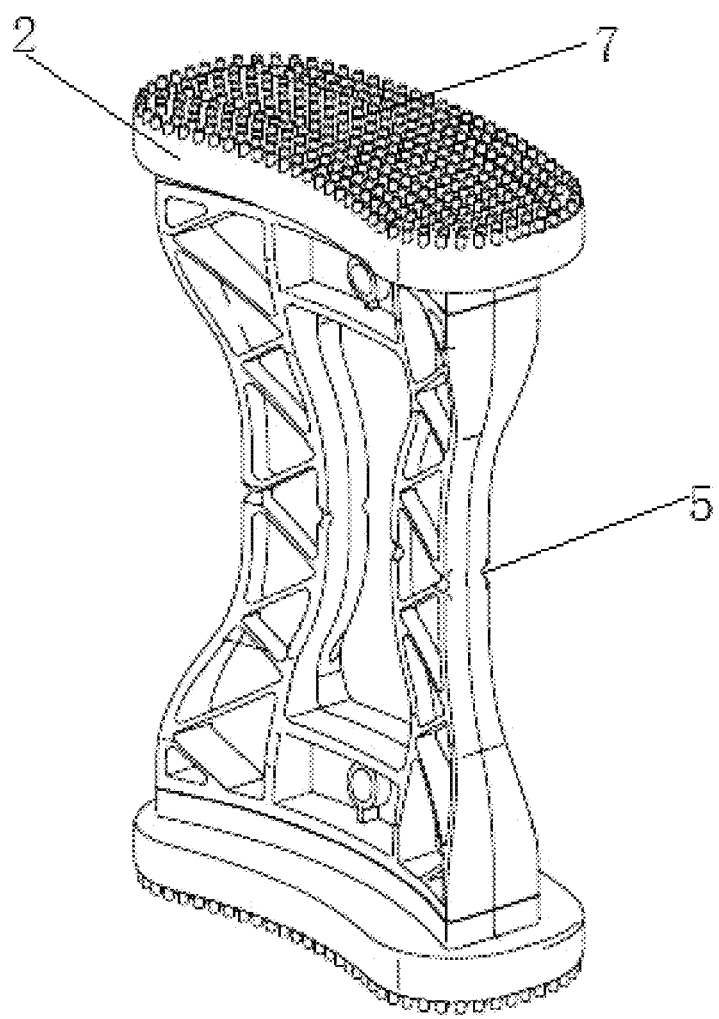
FIG. 3 is a perspective view of the structure of the present invention.
Figure 4:
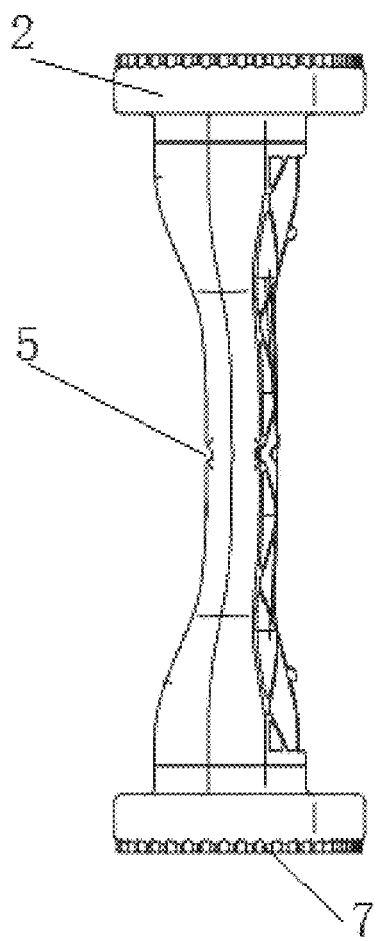
FIG. 4 is a side view of the structure of FIG. 1.
Figure 5:
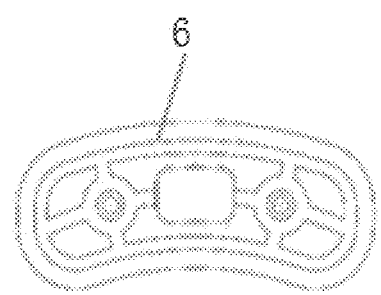
FIG. 5 is a schematic view of the structure of the stepped pieces.

Referring to FIG. 1, FIG. 3 and FIG. 4, as an improvement of the present invention, the shape of the connecting column 1 is also configured as one of an I-shape, an M-shape, and a W-shape. The shape of the notch 5 is configured as a V-shape, a U-shape, a semi-circle or other irregular figures. The notch is configured to make the connecting column 1 prone to fracture by means of the notch effect in the event of a collision, while ensuring the strength of the fuel tank, so as to prevent the surface of the fuel tank from damaging and prevent the fuel tank from leaking. The remaining structures and advantages are exactly the same as those in Embodiment 1.

Embodiment 3

Referring to FIG. 1, FIG. 3 and FIG. 4, as an improvement of the present invention, the notch 5 is provided on the left and/or right side of the connecting column and/or in the middle of the connecting column. The related research has proved that the notch arranged in the middle of the connecting column achieves the optimal effect of fracturing. In addition, the size and shape of the notch need to be adjusted according to the heights of different connecting columns. The remaining structures and advantages are exactly the same as those in Embodiment 1.

Embodiment 4

Referring to FIG. 1, as an improvement of the present invention, the connecting column 1 is a high-strength engineering plastic connecting column or an injection molded high-strength engineering plastic connecting column or an injection molded high-strength reinforced connecting rod. The material of the connecting column includes HDPE, POM, PA, PPA and other resins or engineering plastics. The remaining structures and advantages are exactly the same as those in Embodiment 1.

Embodiment 5

Referring to FIG. 1, as an improvement of the present invention, a reinforcing rib is provided on the connecting column 1 to further improve the high-pressure resistance of the connecting device. The remaining structures and advantages are exactly the same as those in Embodiment 1.

Embodiment 6

Referring to FIG. 1, as an improvement of the present invention, a plurality of holes are formed between the connecting column 1 and the piece 2 to facilitate the firm connection between the connecting column and the piece in the subsequent injection molding and coating processes, and prevent the connecting column from detaching from the piece under the action of tension. The remaining structures and advantages are exactly the same as those in Embodiment 1.

Embodiment 7

Referring to FIGS. 1-3 and 5, as an improvement of the present invention, the coated piece is provided with a plurality of protrusions 7, and is welded to the hollow tank through the protrusions. Alternatively, the coated piece is configured as a smooth surface, and the coated piece is preheated through a preheating plate and welded to the inner wall of the hollow tank. Alternatively, the groove 6 is provided on the coated piece to form stepped pieces, so that the melted material is less likely to flow out of the piece during the preheating and welding process. The remaining structures and advantages are exactly the same as those in Embodiment 1.

In the present invention, the technical features described in Embodiments 2, 3, 4, 5, 6, and 7 can be combined with Embodiment 1 to form a new implementation.

It should be noted that the above-mentioned embodiments are only the preferred embodiments of the present invention, and are not used to limit the scope of protection of the present invention. The scope of protection of the present invention is subject to the claims.

What is claimed is:

1. A support for connecting upper and lower surfaces inside a fuel tank, comprising:
at least two connecting columns, each of the at least two connecting columns comprising an upper side at an upper end and a lower side at a lower end;
an upper piece configured to be attached to the upper side of each of the at least two connecting columns;
a lower piece configured to be attached to the lower side of each of the at least two connecting columns; and
a notch provided on each of the at least two connecting columns, wherein each of the notches is configured to have a stress and a strain concentrated;
wherein two of the at least two connecting columns are connected with two connecting rods;
wherein a material of the two connecting rods is the same as a material of the at least two connecting columns; and
a fixing hole is provided on each of the two connecting rods, and the fixing hole is configured to fix the support when each of the upper piece and the lower piece is coated.

2. The support according to claim 1, wherein,
the upper piece and the lower piece are coated with a plastic, and
a shape of the at least two connecting columns is I-shaped, H-shaped, M-shaped, or W-shaped.

3. The support according to claim 2, wherein
a shape of each of the notches is V-shaped, U-shaped, semicircular or irregular.

4. The support according to claim 3, wherein
each of the notches is provided on a left side or a right side of each of the at least two connecting columns or in a middle of each of the at least two connecting columns.

5. The support according to claim 4, wherein,
each of the at least two connecting columns is a high-strength engineering plastic connecting column or an injection molded high-strength engineering plastic connecting column or an injection molded high-strength reinforced connecting rod.

6. The support according to claim 5, wherein,
a reinforcing rib is provided each of on the at least two connecting columns.

7. The support according to claim 6, wherein,
a plurality of holes are formed near one of the upper piece or the lower piece to facilitate a connection in subsequent injection molding and coating processes.

8. The support according to claim 7, wherein,
each of the upper piece and the lower piece is provided with a plurality of protrusions, and
each of the upper piece and the lower piece is welded to a hollow tank through the plurality of protrusions.

9. The support according to claim 7, wherein,
each of the upper piece and the lower piece is configured as a smooth surface; and each of the upper piece and the lower piece is preheated through a preheating plate and each of the upper piece and the lower piece is welded to an inner wall of a hollow tank; or
a groove is provided on each of the upper piece and the lower piece to form stepped pieces.

10. The support according to claim 6, wherein,
each of the upper piece and the lower piece is provided with a plurality of protrusions, and
each of the upper piece and the lower piece is welded to a hollow tank through the plurality of protrusions.

11. The support according to claim 6, wherein,
each of the upper piece and the lower piece is configured as a smooth surface; and each of the upper piece and the lower piece is preheated through a preheating plate and each of the upper piece and the lower piece is welded to an inner wall of a hollow tank; or
a groove is provided on each of the upper piece and the lower piece to form stepped pieces.

12. The support according to claim 5, wherein,
each of the upper piece and the lower piece is provided with a plurality of protrusions, and
each of the upper piece and the lower piece is welded to a hollow tank through the plurality of protrusions.

13. The support according to claim 5, wherein,
each of the upper piece and the lower piece is configured as a smooth surface; and each of the upper piece and the lower piece is preheated through a preheating plate and each of the upper piece and the lower piece is welded to an inner wall of a hollow tank; or
a groove is provided on each of the upper piece and the lower piece to form stepped pieces.

* * * * *